UNITED STATES PATENT OFFICE 2,201,061

STABILIZING OF OIL

Benjamin H. Thurman, Bronxville, N. Y., assignor to Refining, Inc., Reno, Nev., a corporation of Nevada No Drawing. Application June 8, 1938, Serial No. 212,599

16 Claims. (Cl. 99—163)

This invention relates to the stabilization of oils, and more particularly to the stabilization of refined oils against reversion to their original flavor which takes place prior to rancidity.

An object of the invention is to provide a process of stabilizing caustic refined glyceride oils or fats which in their crude state have a disagreeable odor and taste and which revert to such odor and taste shortly after refining and before rancidity due to oxidation develops.

Another object of the invention is to provide a process of stabilizing glyceride oils which revert to an original unpleasant flavor after refining and prior to rancidity by adding thereto a small amount of a stabilizing agent.

Another object of the invention is to provide a process of stabilizing refined glyceride oils having an unsaturation of their fatty acid radicals greater than two double bonds, or solid or semi-solid products produced therefrom, against reversion to their original flavor prior to rancidity thereof by incorporating with the oil or product a small amount of a vegetable phosphatidic material which is itself stable against such reversion.

A further object of the invention is to provide a new stabilized glyceride oil product produced from highly unsaturated oils, which product will not revert to the original flavor of the oil prior to rancidity.

A still further object of the invention is to provide a stabilized refined soya bean oil product containing a small amount of vegetable phosphatidic material which prevents reversion to the original flavor of the soya bean oil.

The invention will be described with particular reference to the stabilization of soya bean oil, but is applicable to other oils containing fatty acid radicals having more than two double bonds therein, such as, for example, linseed oil and fish oils, including codliver oil and its extracts. Soya bean oil and similar highly unsaturated oils have a characteristic paint-like or fish odor in their crude state. When these oils are subjected to a deodorizing treatment, preferably after being alkali refined, the odor and flavor mentioned is substantially completely removed, such that the oils are extremely palatable. However, I have found that the characteristic unpleasant flavor of the particular oil begins to make itself apparent soon after deodorization has been completed and long before any evidence of rancidity due to oxidation can be detected. This tendency to revert persists even though the oils have been hydrogenated to solid or semi-solid state, for example, to margarine or shortening consistency.

The reversion prior to rancidity caused by oxidation referred to does not present the same problem in oils which do not contain fatty acid radicals having more than two double bonds. That is to say, oils which contain linolenic acid radicals or equivalent acid radicals present a great problem of reversion substantially in advance of rancidity due to oxidation which has not been solved in extensive research by workers in the art prior to the present invention. The linolenic or equivalent acid is largely reduced to a less unsaturated form, for example, to linoleic acid, during hydrogenation into solid or semi-solid products, but it is believed that small amounts of the highly unsaturated fatty acid radicals remain in the oil, and that these probably cause the reversion mentioned, although applicant does not wish to be limited to any precise theory as to the cause of reversion.

In accordance with the present invention, it has been found that certain vegetable phosphatides or phosphatidic materials, when added to soya bean oil or other similar oils, prevent the reversion above discussed. The phosphatidic material employed is that which is recovered from oils which contain no fatty acid radicals having a greater unsaturation than two double bonds. Phosphatides from soya bean oil contain fatty acid radicals having three double bonds (linolenic acid) and are therefore unsuitable for use in the present invention, probably because such phosphatides will themselves revert to the original flavor of the soya bean oil and thus will not prevent reversion of oils to which they are added. On the other hand, the phosphatides or phosphatidic material recovered from such oils as cottonseed or corn oil contain no fatty acid radicals having greater unsaturation than two double bonds and are not only themselves stable against reversion but will actually prevent reversion of such highly unsaturated oils as soya bean oil or products produced from soya bean oil. It is here emphasized that applicant is not concerned primarily with preventing rancidity due to oxidation. For example, soya bean oil phosphatides may possibly somewhat retard actual rancidity in soya bean oil, but will not prevent reversion to the characteristic soya bean flavor long before oxidation and resultant rancidity becomes apparent.

The phosphatides or phosphatidic material employed as a stabilization agent against reversion is preferably that recovered from such oils as cottonseed or corn oil by precipitating the phosphatidic material along with other minor constituents from the oil by means of water or solutions of electrolytes and separating them from the oil by difference in specific gravity. Since crude oils of the type mentioned usually contain small amounts of water, at least a part of the phosphatidic material is ordinarily already in precipitated form and can be removed from the oil either by a settling operation or a centrifugal separation. A larger percentage of the phosphatidic material can, however, be removed from the oil by employing additional precipitating reagent. The preferred process of recovering phosphatides from vegetable oils is disclosed in detail in my copending application Serial No. 6,446, filed February 14, 1935, now Patent No. 2,150,732.

As disclosed in that application, a boric acid solution is the preferred precipitating reagent, as the boric acid is an effective preserving agent against the putrefaction and fermentation of the phosphatidic material which normally occurs soon after separation. By employing this precipitating reagent the phosphatidic material is recovered in thorough admixture with the preserving agent, and it has been found that the phosphatidic material remains stable even after the preserving agent has been neutralized or removed therefrom, for example, by washing with water, salt solutions, and so forth. It is preferable to substantially completely remove the boric acid preserving reagent from the phosphatidic material prior to incorporating the same into food products, but the boric acid may be left in the phosphatidic material if employed in other than food products.

The phosphatidic material from cottonseed oil also usually contains some gossypol, which is a toxic material. This gossypol can be removed by washing with water or by solvent purification, as disclosed in my copending application above referred to, or can be rendered innocuous by subjecting the phosphatidic material to a high temperature treatment of brief duration. It is, however, preferred to remove the gossypol by a purification treatment.

Phosphatidic material from corn oil, however, contains no toxic material, and can be used in substantially its crude state, although it is preferred to subject either the corn or cottonseed crude phosphatides to purification treatment, as disclosed in my said application, so as to remove proteinaceous and other impurities precipitated from the oil along with the phosphatides.

The phosphatidic material employed as a stabilizing medium in the present invention is predominantly acetone insoluble, and the acetone insoluble portion thereof apparently includes the stabilizing ingredient, as the addition of this fraction to soya bean oil renders the same stable against reversion. The purified acetone insoluble cottonseed oil phosphatides are a yellow powder, whereas the purified acetone insoluble fraction of corn oil phosphatides are a white waxy or pasty mass. These materials are contrasted with the purified acetone insoluble fraction of soya bean oil phosphatides produced in the same manner by the fact that the latter are a yellow or brown waxy material. Thus corn oil phosphatides impart no appreciable color when added to soya bean oil, and cottonseed oil phosphatides impart a yellow color which is many times desirable, particularly in margarine products where a yellow color is desired without the addition of artificial coloring matter. The soya bean phosphatides impart a dark color if added to oil. Also, cottonseed and corn oil phosphatides do not cause an oil or other product to which they are added further to discolor when heated, whereas soya bean phosphatides cause the oil to assume an extremely dark color, in many cases a nearly black color, when the oil or other products are subjected to cooking temperatures, for example, 375° to 450° F. At the same time, the soya bean oil phosphatides cause the heated product to have the characteristic unpleasant odor of crude soya bean oil, whereas cottonseed oil phosphatides result in an odor similar to that of a good grade of cottonseed oil shortening and corn oil phosphatides produce a pleasant food odor similar to that of fried eggs. Thus, crude cottonseed oil phosphatides partially purified to remove the gossypol, crude corn oil phosphatides, or more or less purified cottonseed oil and corn oil phosphatides including the highly purified acetone insoluble portion thereof, can be employed as the stabilizing agent.

As the crude phosphatidic materials, when removed from the oil, have been rendered largely insoluble in oil, by the water or other precipitating reagent, it is preferable to render the same oil soluble prior to incorporating them in the soya bean oil. This can be done by removing the water from the phosphatides, preferably by vacuum drying at relatively low temperatures, for example, at room temperatures. The phosphatidic material can be more easily introduced into the oil to be stabilized if they are present in a carrying or viscosity reducing medium, such as a glyceride oil or a highly refined mineral oil. That is to say, it is rather difficult to disperse the dried crude phosphatidic material or the dried solvent free acetone insoluble portions thereof in the oil. Thus, a viscosity reducing agent or carrier, such as is refined cottonseed oil, soya bean oil, corn oil, or highly refined mineral oil, for example, a medicinal mineral oil such as "Nujol," can be added to the products before water or solvent is removed, so as to produce oil soluble phosphatidic material already in dispersion in a viscosity reducing or carrier medium which is miscible with the oil to be stabilized.

The proportion of phosphatidic material necessary to stabilize against reversion is extremely small. For example, .03% up to 1% of the purified phosphatidic material is usually sufficient to stabilize a refined and deodorized soya bean oil against reversion. Somewhat more of the crude material, if employed, is usually necessary, and it is sometimes found necessary to use a somewhat greater proportion of even the purified phosphatidic material to stabilize such oils as linseed, codliver oil or vitamin rich extracts of codliver oil.

The phosphatides of the present invention are distinguished from animal phosphatides or lecithin, in that the vegetable phosphatides of the present invention are largely alcohol insoluble and soluble in petroleum solvents, whereas animal lecithin is soluble in alcohol and soluble in petroleum solvents. They are distinguished from such vegetable phosphatides as soya bean phosphatides by the fact that their fatty acid radicals are of no higher unsaturation than two double bonds. They contain very small amounts of free or bound sugar, either in their crude form or purified form, for example, a cottonseed oil phosphatide in accordance with the present invention contained but 2.9% of reducing sugar and 2.6% of bound sugar. The iodine number of the acetone insoluble portion of cottonseed oil phosphatides is in the neighborhood of 60, and that of a similar portion of corn oil phosphatides is as low as 40, whereas the iodine number of a similar portion of soya bean phosphatides is in the neighborhood of 90. The phosphorus content of the acetone insoluble portion of cottonseed oil phosphatides upon a dry basis is approximately 2.6 to 2.93% and the nitrogen content approximately 0.96%; for the acetone insoluble proportion of corn oil phosphatides the phosphorus content is approximately 3.39% and the nitrogen content approximately 1.09%, as compared to acetone soluble lecithin from egg yolks, which contains approximately 4% phosphorus and 2% nitrogen. It will be noted that the ratio of phosphorus to nitrogen in the vegetable phosphatides is considerably greater than that in the egg yolk lecithin.

As is well known to those skilled in the art, the problem of bad odor and taste has prevented substantial use of soya bean oil or similar highly unsaturated oils in edible products, notwithstanding the fact that a vast amount of research work has been performed by workers in the art in an effort to prevent reversion in flavor of these oils in food products and enable their utilization in food products along with, for example, such oils as cottonseed or corn oil.

It is known that caustic refining of vegetable oils, including soya bean oil and similar oils, destroys the antioxidants naturally present in the crude oils. The restoration of the natural antioxidants of such oils as soya bean oil, after caustic refining, however, has been found to be ineffective to prevent reversion to the original flavor and odor, which occurs quite promptly after refining and long before the oils become rancid due to oxidation. In accordance with the invention herein exhibited, the quick reversion in flavor or taste is prevented and, additionally, the phosphatidic material added for that purpose constitutes also an antioxidant reagent which successfully prevents or retards the subsequent development of rancidity due to oxidation.

It is also known that codliver oil or vitamin extracts or concentrates thereof, while highly beneficial for medicinal purposes, for children as well as adults, will rapidly develop a fish- or paint-like odor and taste which renders them unpalatable and unpleasant and difficult to administer. This problem is not caused by rancidity due to oxidation, as the methods of storing or marketing these products to a large extent prevent such oxidations. By the present invention means are provided for arresting the reversion in flavor and taste so as to render the same palatable and pleasant for consumption.

It will thus be seen that the present invention provides an improved process of stabilizing refined and deodorized soya bean and other highly unsaturated oils against reversion to the original flavor before oxidation, resulting in rancidity, is detectable. This is done by adding small proportions of a phosphatidic material differing from other phosphatidic materials heretofore added to such oils. The present process is effective to stabilize not only the liquid oils but products, such as hydrogenated margarines and shortenings and mayonnaise preparations which are produced from the liquid oil and which also revert to the original flavor of the oil. The product resulting from the process described may be stored or shipped and subjected to relatively high temperatures over extended periods of time without reverting to the original flavor of the crude oil from which the product is derived. The present invention is also applicable in cases where the soya bean or other oil forms only part of the resultant product, for example, mayonnaise or shortenings or margarine products, where the soya bean oil is employed along with other more stable oils such as cottonseed oil or corn oil.

While the present invention is especially directed to the prevention of reversion to the original odor and taste of soya bean oils and similar other highly unsaturated oils by the stabilization thereof with a component which will retard such reversion in advance of the development of rancidity due to oxidation, it is appreciated that phosphatidic material of the type herein disclosed can be added to food products in general, including cottonseed or corn oil products, since the phosphatides of the present invention are incapable of causing the development of an unpleasant odor, as is the case with such phosphatides as soya bean oil phosphatides. Consequently, from a broader aspect the invention may have utility in the employment of phosphatides possessing the characteristics of corn oil and cottonseed oil phosphatides as an antioxidant for oils which have been caustic refined and in that capacity will perform more efficaciously for the reason that such phosphatides, themselves, will not give off an unpleasant flavor and taste in advance of rancidity of the oil. In other words, cottonseed oil, for example, may be stabilized against the development of rancidity due to oxidation without the prior development of bad odor and flavor caused by the stabilizing media themselves.

This application constitutes a continuation in part of my copending application Serial No. 189,849, filed February 10, 1938.

While I have disclosed the preferred embodiments of my invention, it is understood that the details thereof may be varied within the scope of the following claims.

What I claim is:

1. The process of stabilizing glyceride oil products prepared from oils having fatty acid radicals containing more than two double bonds, which comprises, adding to said product a vegetable phosphatidic material of which the fatty acid radicals of the phosphatides contained therein have no more than two double bonds.

2. The process of stabilizing soya bean oil and products prepared therefrom, which comprises, incorporating with said soya bean oil a small proportion of a vegetable phosphatidic material which is free of fatty acid radicals having more than two double bonds.

3. The process of stabilizing refined and deodorized soya bean oil and products prepared therefrom against reversion to the original flavor of the soya bean oil before substantial oxidation thereof takes place, which comprises, incorporating a small proportion of a corn phosphatidic material of which the fatty acid radicals of the phosphatides have no more than two double bonds.

4. The process of stabilizing refined and deodorized soya bean oil and products prepared therefrom against reversion to the original flavor of the soya bean oil before substantial oxidation thereof takes place, which comprises, incorporating a small proportion of a cotton seed phosphatidic material of which the fatty acid radicals of the phosphatides have no more than two double bonds.

5. A new product of manufacture, which comprises, a product prepared from a refined glyceride oil containing fatty acid radicals of greater unsaturation than linoleic acid in admixture with a small proportion of a vegetable phosphatidic material free from fatty acid radicals of greater unsaturation than linoleic acid, said product being stable against reversion to the original flavor of said oil before substantial rancidity occurs.

6. A new product of manufacture, which comprises, a product prepared from a refined glyceride oil containing fatty acid radicals of greater unsaturation than linoleic acid in admixture with a small proportion of cottonseed phosphatidic material of which the phosphatides have no more than two double bonds, said product being stable against reversion to the original flavor of said oil before substantial rancidity occurs.

7. A new product of manufacture, which comprises, a product prepared from a refined glyceride oil containing fatty acid radicals of greater unsaturation than linoleic acid in admixture with a small proportion of corn phosphatidic material of which the phosphatides have no more than two double bonds, said product being stable against reversion to the original flavor of said oil before substantial rancidity occurs.

8. A new product of manufacture, which comprises, a product prepared from soya bean oil in admixture with a small proportion of a vegetable phosphatide free from fatty acid radicals of greater unsaturation than linoleic acid, said product being stable against reversion to the original flavor of said oil before substantial rancidity occurs.

9. A new product of manufacture, which comprises, a product prepared from soya bean oil in admixture with a small proportion of cottonseed phosphatides which are free from fatty acid radicals having more than two double bonds, said product being stable against reversion to the original flavor of said oil before substantial rancidity occurs.

10. A new product of manufacture, which comprises, a product prepared from soya bean oil in admixture with a small proportion of corn phosphatides which are free from fatty acid radicals having more than two double bonds, said product being stable against reversion to the original flavor of said oil before substantial rancidity occurs.

11. The process of stabilizing refined fatty oils and fats which comprises the step of: adding to the oils or fats a small percentage of cottonseed phosphatides which are free of fatty acid radicals having more than two double bonds and which have been isolated from crude cottonseed oil and concentrated, without destruction thereof, whereby said isolated and concentrated phosphatidic material is relatively free of deleterious impurities.

12. The process of stabilizing refined fatty oils and fats which comprises the step of: adding to the oils or fats a small percentage of corn phosphatides which are free of fatty acid radicals having more than two double bonds and which have been isolated from crude corn oil and concentrated, without destruction thereof, whereby said isolated and concentrated phosphatidic material is relatively free of deleterious impurities.

13. The process of stabilizing refined glyceride oils and fats which comprises the steps of: adding to the oils or fats a small percentage of vegetable phosphatidic material free from fatty acid radicals having more than two double bonds which phosphatidic material has been isolated from crude vegetable oils free from fatty acid radicals having more than two double bonds and concentrated whereby the said phosphatidic material is substantially free of deleterious impurities.

14. A new product of manufacture which comprises a product prepared from a refined glyceride oil in admixture with a small proportion of vegetable phosphatidic material free from fatty acid radicals having more than two double bonds, said phosphatidic material having been isolated from crude vegetable oils free from fatty acid radicals having more than two double bonds and being concentrated and substantially free of deleterious ingredients.

15. A new product of manufacture which comprises: a product prepared from refined cottonseed oil in admixture with a small proportion of corn oil phosphatidic material free from fatty acid radicals having more than two double bonds, said corn oil phosphatidic material having been isolated from crude corn oil free from fatty acid radicals having more than two double bonds and being concentrated and substantially free of deleterious ingredients.

16. The process of stabilizing refined cottonseed oil and fats which comprises the step of: adding to the oils or fats a small percentage of corn oil phosphatides which are free of fatty acid radicals having more than two double bonds and which have been isolated from crude corn oil and concentrated, without destruction thereof, whereby said isolated and concentrated corn oil phosphatidic material is relatively free of deleterious impurities.

BENJAMIN H. THURMAN.